(12) United States Patent
Kim

(10) Patent No.: US 7,717,567 B2
(45) Date of Patent: May 18, 2010

(54) LIGHTING OPTICAL SYSTEM

(75) Inventor: Nam Sik Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/030,450

(22) Filed: Feb. 13, 2008

(65) Prior Publication Data

US 2008/0137209 A1    Jun. 12, 2008

Related U.S. Application Data

(62) Division of application No. 11/027,629, filed on Dec. 30, 2004, now Pat. No. 7,357,516.

(30) Foreign Application Priority Data

Dec. 31, 2003    (KR) .................... 10-2003-0101395

(51) Int. Cl.
G03B 21/28    (2006.01)
(52) U.S. Cl. ................. 353/33; 353/81; 349/8
(58) Field of Classification Search ............... 353/33, 353/31, 37, 81, 34; 348/752, 757, 779, 780; 349/5, 7, 8, 9, 57, 58, 62, 61; 359/634, 638
See application file for complete search history.

(56) References Cited

U.S. PATENT DOCUMENTS

| | | | | |
|---|---|---|---|---|
| 4,962,997 A * | 10/1990 | Baldwin | ................... | 349/8 |
| 5,231,431 A * | 7/1993 | Yano et al. | ................... | 353/31 |
| 5,298,986 A * | 3/1994 | Owada et al. | ................... | 348/762 |
| 6,031,587 A | 2/2000 | Okuyama et al. | | |
| 6,067,128 A * | 5/2000 | Imai | ................... | 349/8 |
| 6,793,344 B2 * | 9/2004 | Kwok et al. | ................... | 353/84 |
| 7,172,290 B2 * | 2/2007 | Li | ................... | 353/37 |
| 2003/0048421 A1 * | 3/2003 | Du | ................... | 353/31 |
| 2003/0189693 A1 | 10/2003 | Ishino | | |

FOREIGN PATENT DOCUMENTS

| | | |
|---|---|---|
| EP | 0338810 A2 | 10/1989 |
| EP | 0741312 A2 | 11/1996 |
| WO | WO 95/06392 | 3/1995 |

* cited by examiner

*Primary Examiner*—William C Dowling
(74) *Attorney, Agent, or Firm*—Lee, Hong, Degerman, Kang & Waimey

(57) ABSTRACT

Disclosed is a lighting optical system, including: a lighting optical system, comprising, a light separating means for separating incident light into three colored lights according to wavelength bands, and progressing the three separate colored lights for the same amount of distance from a light source of the incident light through different optical paths, and emitting the three separate colored lights to a first, a second and a third LCD, a first, a second and a third LCD for respectively receiving the three colored lights from the light separating means, and forming images therefrom; and a light combining means for synthesizing the three colored lights emitted from the first, second and third LCD, and outputting the synthesized light outside.

7 Claims, 8 Drawing Sheets

LIGHTING OPTICAL SYSTEM

This application is a divisional of application Ser. No. 11/027,629, now U.S. Pat. No. 7,357,516, filed Dec. 30, 2004, which pursuant to 35 U.S.C. §119(a) claims the benefit of Korean Patent Application No. 10-2003-0101395, filed on Dec. 31, 2003, which is hereby incorporated by reference as if fully set forth herein.

BACKGROUND OF THE INVENTION

1. Field of the Invention

The present invention relates to a lighting optical system, and more particularly, to a small-sized lighting optical system with an improved performance.

2. Background of the Related Art

Technical advances in display devices have created lighter, thinner and larger screens.

Examples of such display device include projectors or big-screen projection TVs.

In recent years, micro devices have been introduced as a new technology for projectors and projection TVs. Examples of micro device include backlit LCD (HTPS) panels, reflective LCoS (Liquid Crystal on Silicon) panels, and DMD (Digital Micromirror Device) panels.

Depending on how many micro devices are used, the projectors or the projection systems can be categorized as single-panel, double-panel, and triple-panel projectors or projection systems.

In case of the backlit LCD (HTPS), triple-panel optical systems are widely used. As for the LCoS triple-panel, double-panel and single-panel optical systems are all available. As for the DMD, single-panel optical systems are generally used. However, it should be noticed that each of these examples does not always have advantages only.

For instance, a triple-panel optical system for the backlit LCD (HTPS) has too many optical elements and includes a relay lens for compensating optical path differences.

Besides the relay lens, the backlit LCD uses an X-prism for combining colors.

Since there is an optical path difference among R, G and B lights, there was a need to develop a new optical system capable of compensating the optical path difference. That was how the X-prism got involved therein.

FIG. 1 is a schematic diagram illustrating a triple-panel projection system according to a related art.

Referring to FIG. 1, the triple-panel projection system includes a lamp 110 for emitting light; fly-eye lenses 120, 121 for splitting the light emitted from the lamp 110 into micro lens cell units; a PBS (Polarizing Beam Array) 130 for forming incident light into a linearly polarized light with one optical axis; condensing lenses 140, 142, 142 for condensing light; dichroic lenses 151, 152 for splitting the light into R, G and B colors; LCDs (Liquid Crystal Displays) 161, 162, 163 for providing or displaying R, G and B images; mirrors 171, 172, 173 for changing a traveling path of each of the split lights by the dichroic lenses 151, 152 so that the split lights travel to their corresponding LCDs 161, 162, 163, respectively; relay lenses 181, 182 disposed on the traveling path of light to focus the light to a desired position; and an X-prism 190 for combining images from the LCDs 161, 162, 163, respectively.

The following will now explain the operation of the related art projection system described above.

The light from the lamp 110 incidents on the first dichroic lens 151.

The first dichroic lens 151 then reflects red light and transmits cyan light.

The red light reflected from the first dichroic lens 151 is reflected again by the mirror 171 and incidents on the first LCD 161.

The second dichroic lens 152 reflects green light and transmits blue light.

The green light reflected from the second dichroic lens 152 incidents on the second LCD 162.

The blue light transmitted through the second dichroic lens 152 goes through the relay system 200 consisting of the first and second relay lenses 181, 182, and the first and second mirrors 172, 173, and as a result the light path difference of the blue light from the red and green lights is compensated. Afterwards the blue light incidents on the third LCD 163.

The incident lights on the first, second and third LCDs 161, 162, 163 experience phase modulation according to an input signal and put corresponding image information therein. The lights containing the image information are then emitted from the first, second and third LCDs 161, 162, 163, are synthesized through the X-prism 190, and reach a screen (not shown) by means of a projection lens (not shown).

The above-described projection system (or projector) requires a number of optical elements for splitting and combining colors.

It also requires the relay system for compensating the light path of the blue light to make it equal to those of the red and green lights.

Because of the relay system the size of a light engine is increased, more optical elements are required, and a great number of elements should be adjusted to array an optical axis.

Meanwhile, the red and blue lights were in the same polarization state to obtain a maximum light efficiency taking advantage of the X-prism, but the green light had a different polarization state. Therefore, a retardation plate was additionally installed next to the X-prism to make the green light have the same polarization state with that of the red and blue lights.

SUMMARY OF THE INVENTION

Accordingly, the present invention is directed to a lighting optical system that substantially obviates one or more problems due to limitations and disadvantages of the related art.

An object of the present invention is to provide an lighting optical system having less elements and a simple constitution.

Another object of the present invention is to provide a lighting optical system without a relay system by fixing the distances from R, G and B LCDs to a projection lens.

Still another object of the present invention is to provide a lighting optical system with an improved performance by conforming the polarization states of output lights.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a lighting optical system, comprising, a light separating means for separating incident light into three colored lights according to wavelength bands, and progressing the three separate colored lights for the same amount of distance from a light source of the incident light through different optical paths, and emitting the three separate colored lights to a first, a second and a third LCD, a first, a second and a third LCD for respectively receiving the three colored lights from the light separating means, and forming images therefrom; and a light combining means for synthesizing the three colored lights emitted from the first, second and third LCD, and outputting the synthesized light outside.

Preferably, the light separating means includes a first and a second color separating plane inclinedly disposed in parallel with the direction of the incident light, and a total reflection plane disposed in parallel with a direction perpendicular to the first color separating plane and the incident light.

In the exemplary embodiment of the present invention, the light separating means includes a group of prisms, the prisms reflecting through the first color separating plane light in the first wavelength band towards the total reflection plane at right angles to the incident light; reflecting through the second color separating plane light in the second wavelength band and emitting the light outside in a direction perpendicular to the incident light; reflecting through the total reflection plane the light in the first wavelength band from the first color separating plane and emitting the light outside in parallel with the incident light; and emitting light in the third wavelength band outside provided that the light transmits through the first and second color separating planes.

Preferably, the light separating means includes: a first parallelogram-shaped prism with one inclined surface being formed of a first color separating plane and the other inclined surface being formed of a total reflection plane; a second parallelogram-shaped prism with a second color separating plane formed on one inclined surface; and a triangle-shaped prism.

Preferably, the first parallelogram-shaped prism is installed in such a manner that the first color separating plane receives the incident light through the one inclined surface, and the total reflection plane is disposed in parallel to a direction perpendicular to the first color separating plane; the second parallelogram-shaped prism is installed in such a manner that the second color separating plane is in parallel with the first color separating plane of the first parallelogram-shaped prism, and an inclined surface on which the second color separating surface is not formed is tightly attached to the first color separating plane of the first parallelogram-shaped prism and is not exposed to air; and the triangle-shaped prism is installed in such a manner that an inclined surface thereof is tightly attached to the second color separating surface of the second parallelogram-shaped prism and is not exposed to air.

Preferably, the light separating means includes a first triangle-shaped prism having a first color separating plane formed on one inclined surface, a second triangle-shaped prism having a second color separating plane formed on one inclined surface, a third triangle-shaped prism having a total reflection plane formed on one inclined surface, and two triangle-shaped prisms.

Preferably, the first and second color separating planes on the first and second triangle-shaped prisms are disposed, respectively, in parallel with in a direction of the incident light, and the total reflection plane of the third triangle-shaped prism is disposed in parallel with a direction perpendicular to the first color separating plane of the first triangle-shaped prism.

Preferably, the light separating means includes a plurality of triangle-shaped prisms or a plurality of parallelogram-shaped and triangle-shaped prisms.

Preferably, the light combining means includes a first and a second color combining plane inclinedly disposed in parallel with the direction of the incident light, and a total reflection plane disposed in parallel with a direction perpendicular to the first color separating plane and the incident light.

Preferably, the light combining means includes a group of prisms, in which the prisms synthesizes, through the first color combining plane, an emitted light from the first LCD with an emitted light from the second LCD, transmitting an emitted light from the first LCD, and synthesizing the emitted light from the second LCD with the emitted light from the first LCD and reflecting the synthesized light; reflects, through the total reflection plane, the emitted light from the third LCD, in a direction at right angles to the incident light and outputting the same to the second color combining plane; and synthesizes, through the second color combining plane, the emitted light from the first color combining plane with the emitted light from the total reflection plane, and emitting the synthesized light outside.

Preferably, the second color combining plane reflects the emitted light from the first color combining plane in a direction at right angles to the incident light, synthesizes the same with the emitted light from the total reflection plane, and emits the synthesized light outside.

Preferably, the second color combining plane reflects the emitted light from the total reflection plane in a traveling direction of the incident light, synthesizes the same with the emitted light from the first color combining plane, and emits the synthesized light outside.

Preferably, the light combining means includes: a first triangle-shaped prism having the first color combining plane formed on one inclined surface; a second triangle-shaped prism having the second color combining plane formed on one inclined surface; a parallelogram-shaped prism having the total reflection plane formed on one inclined surface; and a third triangle-shaped prism having one inclined surface attached to the first color combining plane between the first triangle-shaped prism and the first LCD.

Preferably, the light combining means includes: a first triangle-shaped prism having the first color combining plane formed on one inclined surface; a parallelogram-shaped prism, having the second color combining plane formed on one inclined surface and the total reflection plane formed on another inclined surface that is in parallel with the afore-said inclined surface; a second triangle-shaped prism having the second color combining plane formed on one inclined surface; and a third triangle-shaped prism having one inclined surface attached to the first color combining plane between the first triangle-shaped prism and the first LCD.

Preferably, the light combining means includes: a first triangle-shaped prism having the first color combining plane formed on one inclined surface; a second triangle-shaped prism having the second color combining plane formed on one inclined surface; a third triangle-shaped prism having the total reflection plane formed on one inclined surface; a fourth triangle-shaped prism having an inclined surface attached to the second color combining plane between the second triangle-shaped prism and the third triangle-shaped prism; and a fifth triangle-shaped prism having one inclined surface attached to the first color combining plane between the first triangle-shaped prism and the first LCD.

Preferably, the light combining means includes: a first triangle-shaped prism having the first color combining plane formed on one inclined surface; a second triangle-shaped prism having the second color combining plane formed on one inclined surface; a third triangle-shaped prism having the total reflection plane formed on one inclined surface; a fourth triangle-shaped prism having an inclined surface attached to the second color combining plane between the first triangle-shaped prism and the second triangle-shaped prism; and a fifth triangle-shaped prism having one inclined surface attached to the first color combining plane between the first triangle-shaped prism and the first LCD.

Preferably, the light combining means includes: a first parallelogram-shaped prism, having the second color combining plane formed on one inclined surface and the second color combining plane formed on another inclined surface; a second parallelogram-shaped prism having the total reflection plane formed on another inclined surface; and a triangle-shaped prism having one inclined surface attached to the first color combining plane between the first triangle-shaped prism and the first LCD.

Preferably, the light combining means includes: a first parallelogram-shaped prism having the first color combining plane formed on one inclined surface; a second parallelogram-shaped prism, having the second color combining plane formed on one inclined surface and the total reflection plane formed on another inclined surface; and a triangle-shaped prism having one inclined surface attached to the first color combining plane between the first triangle-shaped prism and the first LCD.

Preferably, the light combining means includes a plurality of triangle-shaped prisms, or at least one parallelogram-shaped prism and at least one triangle-shaped prism are tightly attached in such a manner that from a plane of incidence on which the three colored lights emitted from the LCDs to a plane of emission from which a synthesized light with the three colored lights is emitted are not exposed to air.

Preferably, the lighting optical system according to the present invention includes in front of the light separating means: a lamp for emitting non-polarized white light; eye-fly lenses for splitting the white light emitted from the lamp into micro lens cell units; and a PBS array for transforming the non-polarized white light into the polarized white light.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 2:
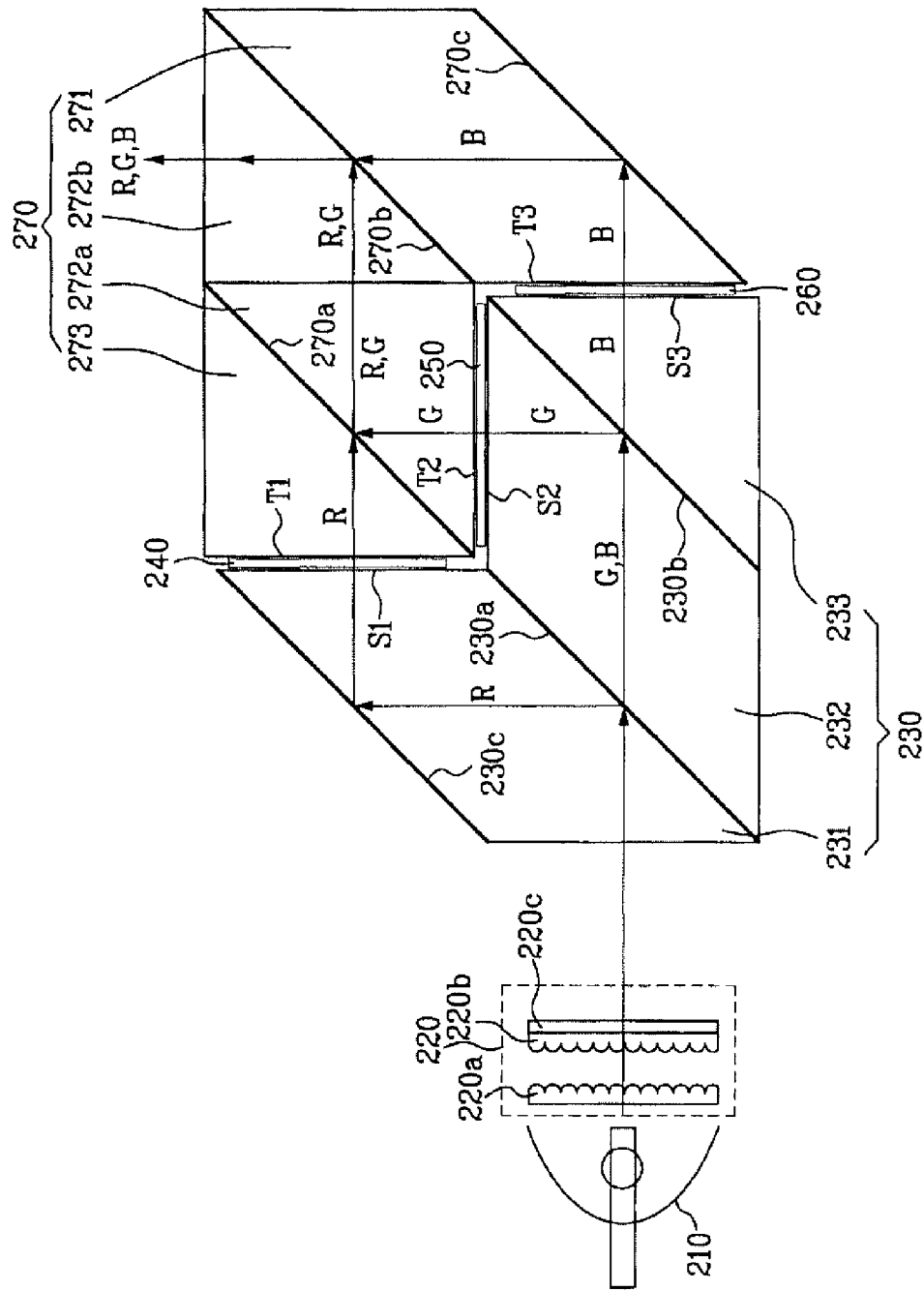
FIG. 2 illustrates a triple-panel lighting optical system according to a first embodiment of the present invention.

FIG. 2 illustrates a triple-panel lighting optical system according to a first embodiment of the present invention.

Figure 1:
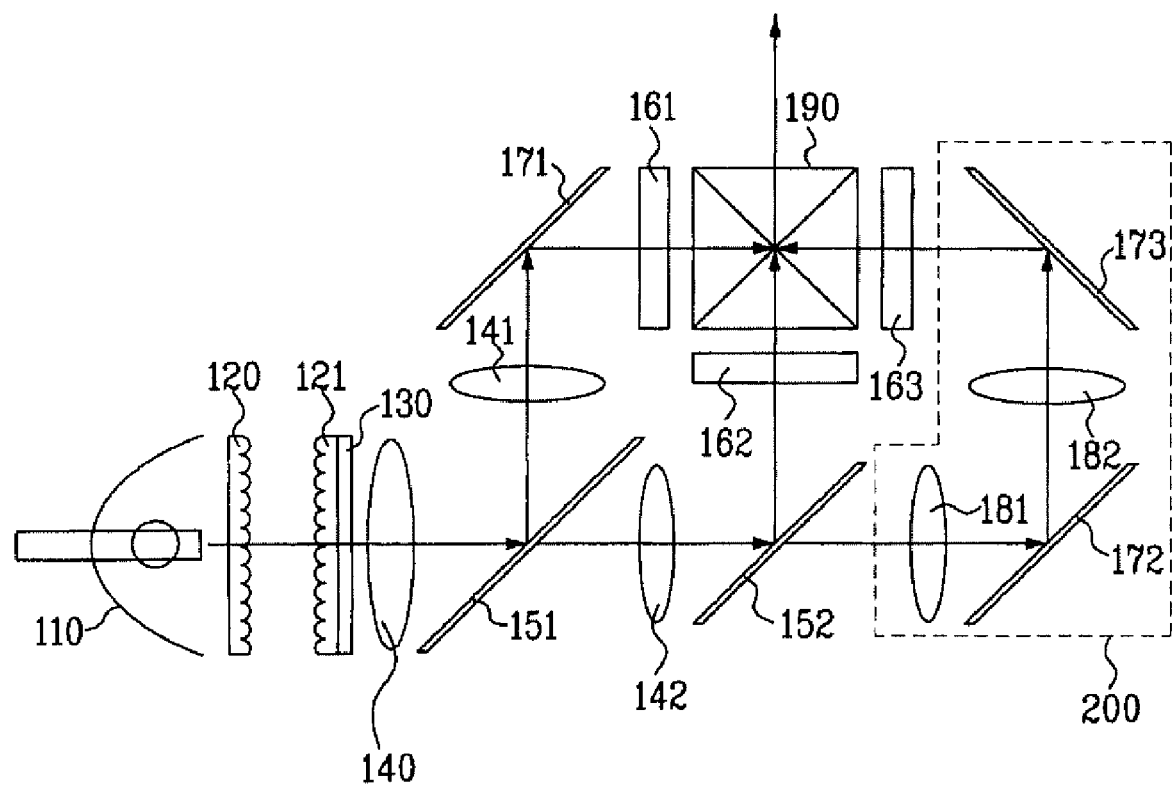
FIG. 1 is a schematic diagram of a triple-panel projection system according to a related art.

As shown in FIG. 1 the lighting optical system includes a lamp 210, a polarization converting system 220, a color-separating prism group 230 (a first, a second and a third dichroic prism 231, 232, 233), a first, a second and a third LCD 240, 250, 260, and a color combining prism group 270 (a first, a second, a third and a fourth color combining prism 271, 272a, 272b, 273.

The polarization converting system 22—includes a first and a second fly-eye lens 220a, 220b, and a PBS array 220c.

The first and second fly-eye lenses 220a, 220b split white light emitted from the lamp 210 into micro lens cell units, thereby resulting in a uniform light distribution.

The PBS array 220c separates an incident light to linearly polarized light having one optical axis, namely p-polarization and s-polarization. Here, the PBS array 220c emits an S-wave as it is, but converts a P-wave to an S-wave by means of a ½ wave plate (not shown) before emitting. In this manner, the resulting polarization states are conformed.

The color separating prism 230 separates a polarized light inputted through the polarization converting system 220 into red, green and blue lights, and output the lights to different paths from each other.

To this end, the color separating prism group 230 has an approximately 'L' shape.

The color separating prism group 230 includes the first and second color separating prisms 231, 232 in the parallelogram shape, and the third color separating prism 233 in the triangle shape.

The first color separating prism 231 forms a first dichroic coating 230b on one inclined surfaces, and a total reflection coating 230c on the other inclined surface.

The second color separating prism 232 forms a second dichroic coating 230b on one inclined surface.

Here, the first dichroic coating 230a and the second dichroic coating 230b are disposed in parallel with the X-axis direction. And the first dichroic coating 230a and the total reflection coating 230c are disposed in parallel with the Y-axis direction.

The inclined surface of the third color separating prism 233 is attached to the second dichroic coating 230b of the second color separating prism 232 in such a manner that the first, second and third color separating prisms 231, 232, 233 are not exposed to air.

The first and second dichroic coatings 230a, 230b and the total reflection coating 230c are disposed in angles so that the emission direction of the light reflected therefrom is at right angles to the direction of incidence.

Therefore, the light reflected from the first and second dichroic coatings 230a, 230b is emitted in the Y-axis direction that makes a right angle with the X-axis direction.

The light, which was reflected from the first dichroic coating 230a and traveled along the Y-axis direction, is then reflected by the total reflection coating 230c and travels in the X-axis direction.

More specifically speaking, the first dichroic coating 230a reflects a desired wavelength band, the red light for example, towards the total reflection coating 230c, and transmits the cyan (G, B) light towards the second dichroic coating 230b.

The total reflection coating 230c reflects again the red light that has been reflected from the first dichroic coating 230a, and emits it outside through a first plane of emission S1.

The second dichroic coating 230b reflects the green light for example out of the transmitted cyan light, and emits it outside through a second plane of emission S2. The residual blue light is emitted outside through a third plane of emission S3.

The first, second and third LCDs 240, 250, 260 are disposed, respectively, on the light paths of RGB lights corresponding to the first through third planes of emission S1, S2, S3. In other words, when RGB lights are emitted from the first, second and third planes of emission S1, S2, S3, the first, second and third LCDs 240, 250, 260 installed on opposite sides of those planes provide RGB images, respectively.

Figure 8:
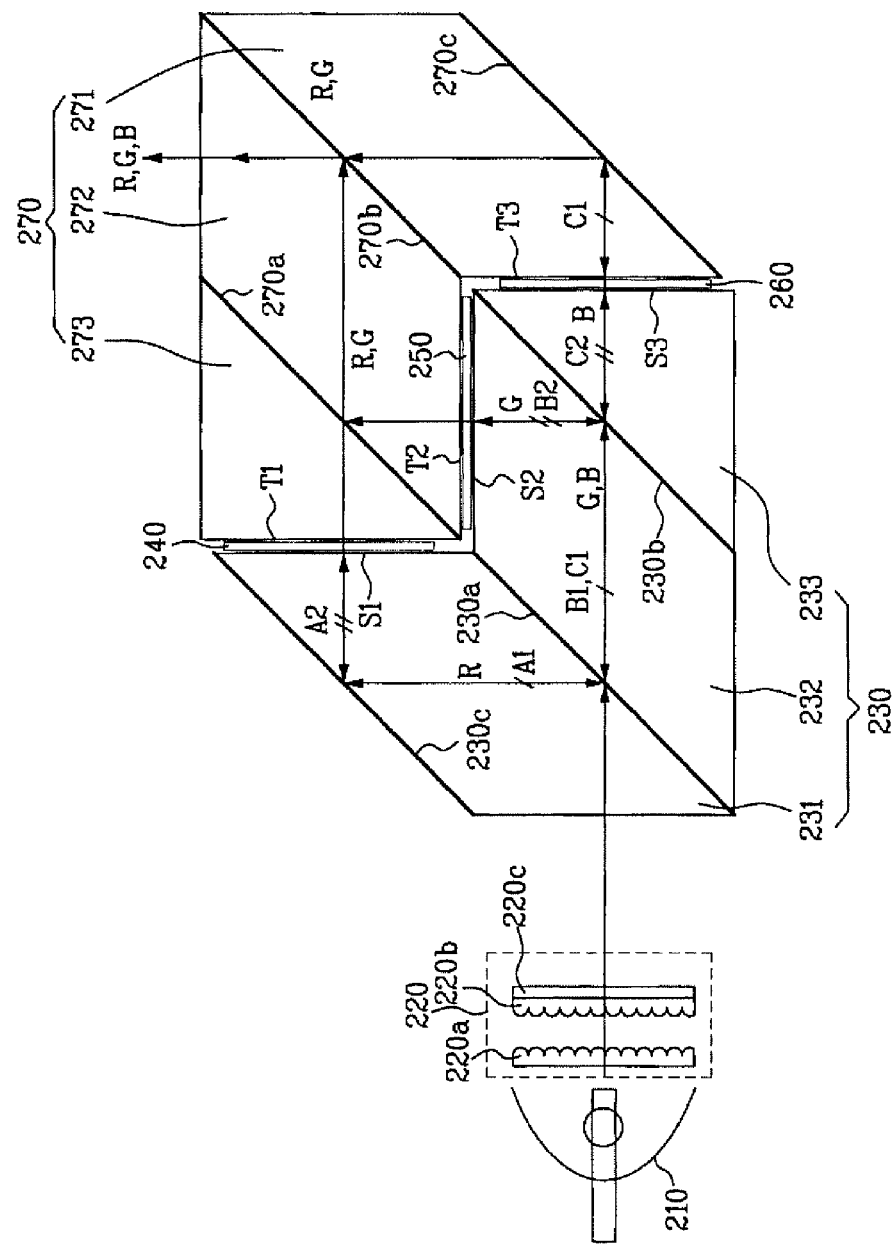
FIG. 8 is a diagram to explain traveling distances of three color lights from a color separating prism to first, second and third LCDs, respectively, in a triple-panel lighting optical system according to the present invention.

The color separating prism group 230 is designed in such a manner that the traveling distance of each of the RGB lights from the lamp (the light source) 210 to the first, second and third LCDs 240, 250, 260 is the same (please refer to FIG. 8).

In other words, the distances from the plane of incidence of the color separating prism group 230 to the first LCD 240 (A1+A2), the second LCD 250 (B1+B2) and the third LCD 260 (C1+C2) are all the same.

Since the traveling distances of the incident light from the lamp 210 to the first, second and third LCDs 240, 250, 260 via the color separating prism 230 are the same, a relay system is no longer needed.

The color combining prism group 270 combines RGB lights emitted from the first, second and third LCDs 240, 250, 260, and outputs white light (R+G+B) to outside.

The color combining prism group 270 is similar to the 180 degree-rotated color separating prism group.

The color combining prism group 270 includes a first color combining prism 271 in the parallelogram shape, and a second, a third and a fourth color combining prism 272a, 272b, 272 in the triangle shape, each of the color combining prisms being made out of the same material.

Here, an inclined surface of the second color combining prism 272a forms a third dichroic coating 270a.

Similarly, an inclined surface of the second color combining prism 272b forms a fourth dichroic coating 270b.

Also, a total reflection coating 270c is formed on one inclined surface of the first color combining prism 271 in the parallelogram shape.

The third dichroic coating 270a and the fourth dichroic coating 270b are disposed in parallel with the X-axis direction. The fourth dichroic coating 270b and the total reflection coating 270c are disposed in parallel with the Y-axis direction. Later the parallelogram-shaped prism 271 and the three triangle-shaped prisms 272a, 272b, 273 are attached to each other not to be exposed to air.

The fourth color combining prism 273 is attached in such a manner that it is not exposed to air especially between the second color combining prism 272a and the first LCD 240.

The third dichroic coating 270a transmits a light element, the red light for example, entering through the first plane of incidence TI, and reflects in the X-axis direction a light element, the green light for example, entering through a second plane of incidence Ti, whereby a yellow light synthesized with the red and green lights is outputted towards the fourth dichroic coating 270b.

The total reflection coating 270c reflects a light element, the blue light for example, which enters through the third plane of incidence T3, in the direction of the fourth dichroic coating 270b.

The fourth dichroic coating 270b transmits the blue light from the total reflection coating 270c and reflects the yellow light (R,G) from the third dichroic coating 270a, whereby a white light synthesized with the blue and yellow lights is outputted to outside.

Figure 3:
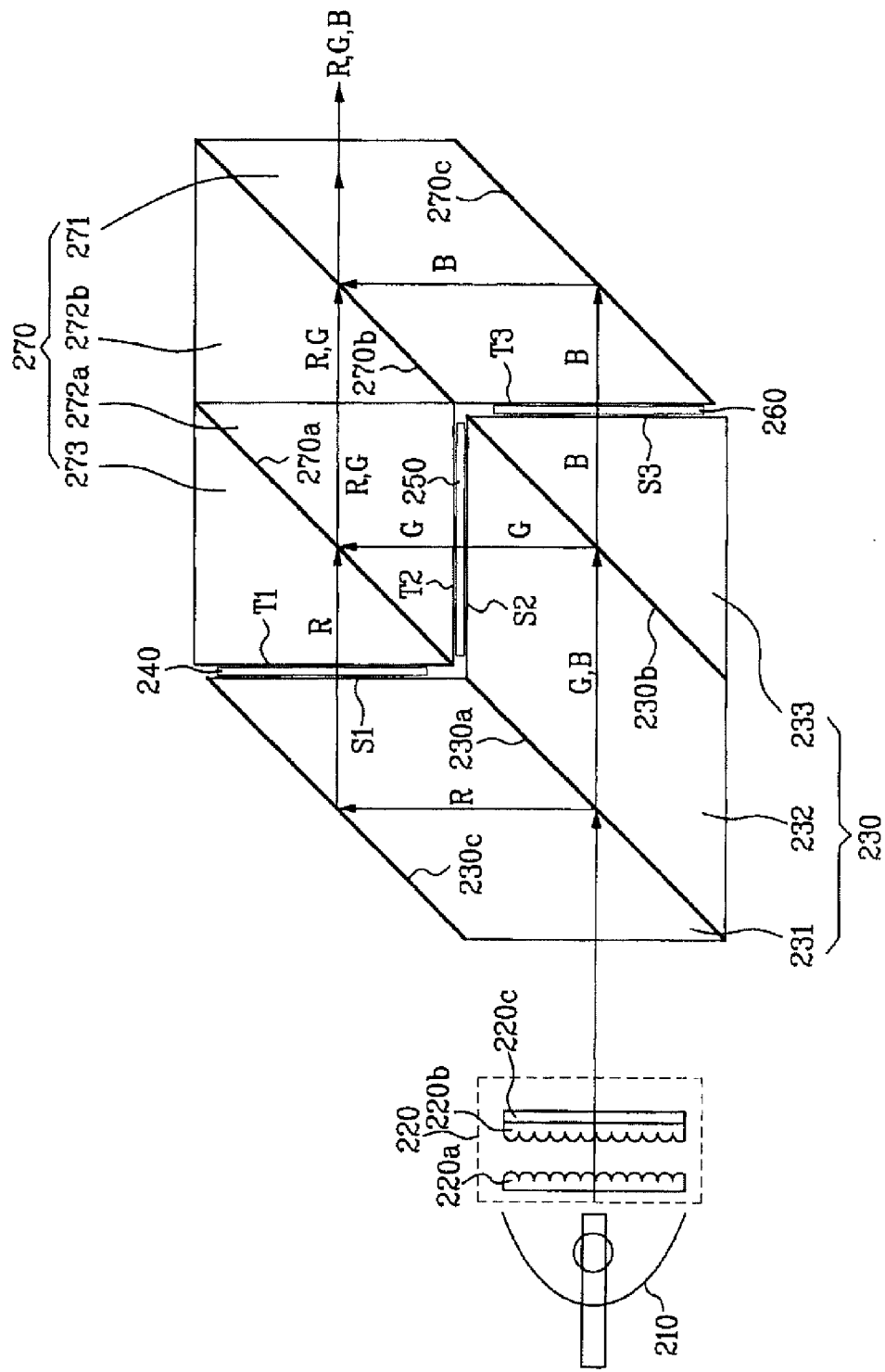
FIG. 3 illustrates a triple-panel lighting optical system according to a second embodiment of the present invention.

FIG. 3 illustrates a triple-panel lighting optical system according to a second embodiment of the present invention.

The constitution of the triple-panel lighting optical system according to the second embodiment of the present invention is basically similar to that of the first embodiment of the present invention, except for one difference in the following.

The fourth dichroic coating 270b is not formed on the inclined surface of the third color combining prism 272b, but on the inclined surface of the first color combining prism 271 that is in parallel with the total reflection coating 270c. As a result, the yellow light from the third dichroic coating 270a is transmitted through the second color combining prism 272b, and the blue light from the total reflection coating 270a is reflected in the X-axis direction by the fourth dichroic coating 270b. More specifically, the synthesized light with yellow and blue is outputted outside along the X-axis.

Since the rest of constitution and functions are identical with those of the first embodiment, they will not be discussed here.

Figure 4:
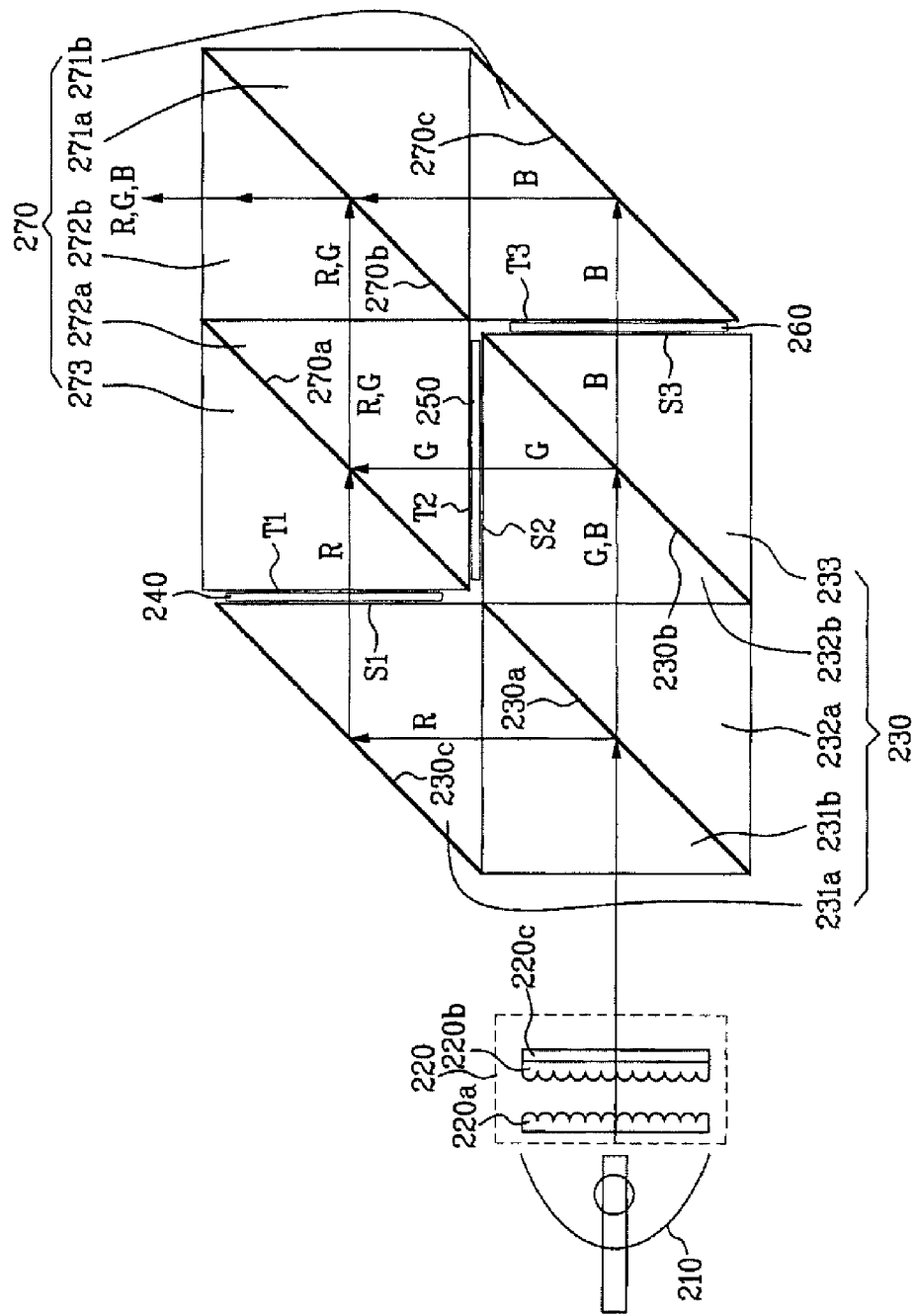
FIG. 4 illustrates a triple-panel lighting optical system according to a third embodiment of the present invention.

FIG. 4 illustrates a triple-panel lighting optical system according to a third embodiment of the present invention.

The triple-panel lighting optical system according to the third embodiment of the present invention includes a color separating prism group 230 consisting of five triangle-shaped prisms, and a color combining prism group 270 consisting of five triangle-shaped prism.

To make the color separating prism group 230, five triangle-shaped prisms made out of the same material are prepared. First and second dichroic coatings 230a, 230b are formed on the inclined surfaces of two triangle-shaped prisms 231b, 232b, respectively, and a total reflection coating 230c is formed on the inclined surface of another triangle-shaped prism 231a. These five triangle-shaped prisms are then attached to each other in such a manner that the first and second dichroic coatings 230a, 230b are disposed in parallel with the X-axis direction, and the first dichroic coating 230a and the total reflection coating 230c are disposed in parallel with the Y-axis direction.

In like manner, five triangle-shaped prisms (a first to a fifth color combining prism) 271a, 271b, 272a, 272b, 273 made out of the same material are prepared to make the color combining prism 270. Then third and fourth dichroic coatings 270a, 270b are formed on the inclined surfaces of the third and the fourth color combining prisms 272a, 272b, respectively, and a total reflection coating 270c is formed on the inclined surface of the second color combining prism 272b. These five triangle-shaped prisms are attached to each other in such a manner that the third and fourth dichroic coatings 270a, 270b are disposed in parallel with the X-axis direction, and the third dichroic coating 270a and the total reflection coating 270c are disposed in parallel with the Y-axis direction.

The fourth dichroic coating 270b transmits the blue light from the total reflection coating 270c, and reflects in the Y-axis direction the yellow light (R,G) from the third dichroic coating 270a, whereby a white light synthesized with the blue and yellow lights is outputted outside along the Y-axis direction.

Figure 5:
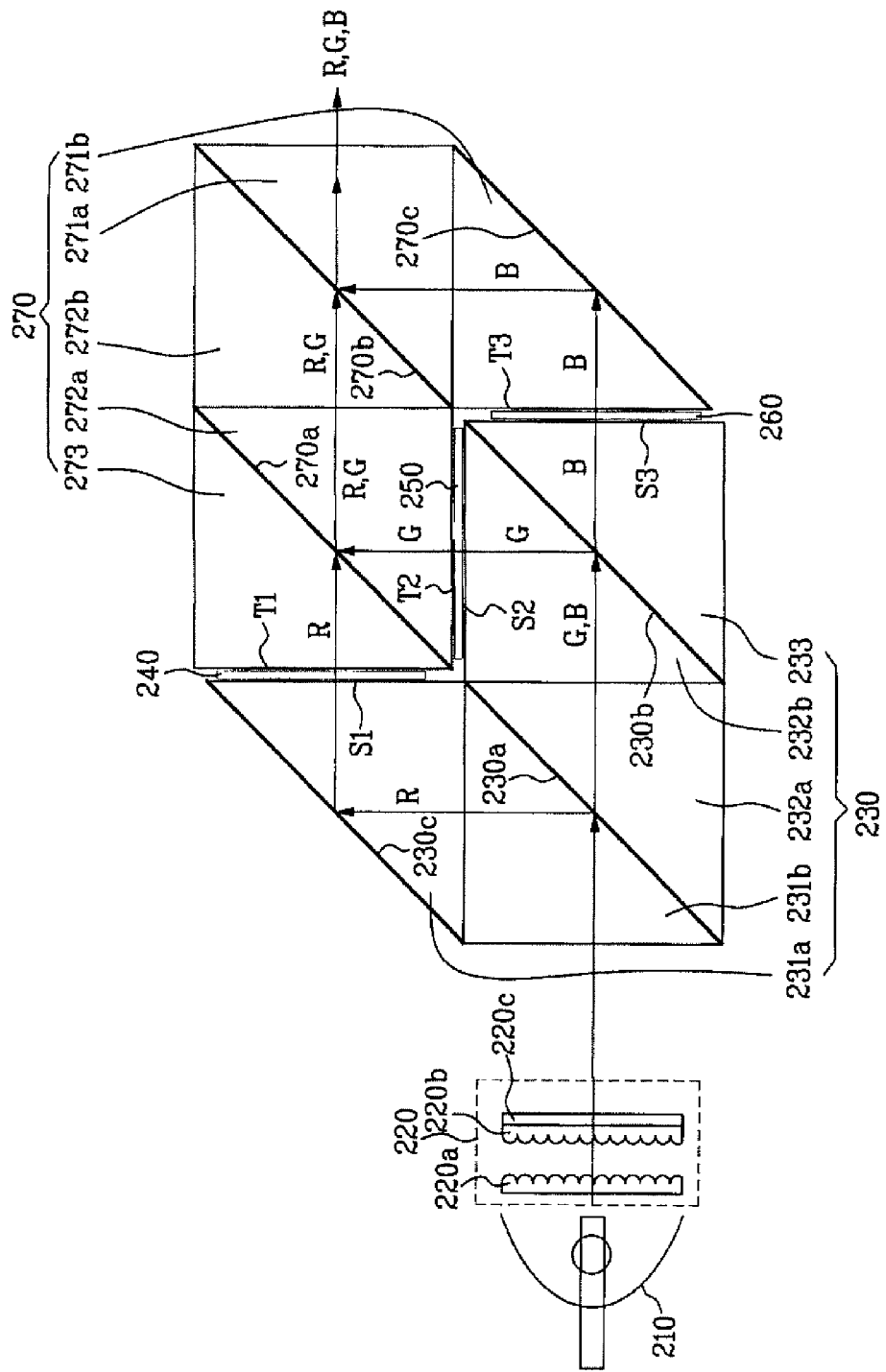
FIG. 5 illustrates a triple-panel lighting optical system according to a fourth embodiment of the present invention.

FIG. 5 illustrates a triple-panel lighting optical system according to a fourth embodiment of the present invention.

The constitution of the triple-panel lighting optical system according to the fourth embodiment of the present invention is basically similar to that of the third embodiment of the present invention, except for one difference in the following.

The fourth dichroic coating 270b in the fourth embodiment is formed on an inclined surface of the first color combining prism 271a. In other words, unlike in the third embodiment of the present invention, the fourth dichroic coating 270b transmits in the X-axis direction the yellow light from the third dichroic coating 270a, and also reflects in the X-axis direction the blue light from the total reflection coating 270c. As a result, a white light synthesized with the blue and yellow lights is outputted outside along the X-axis direction.

Figure 6:
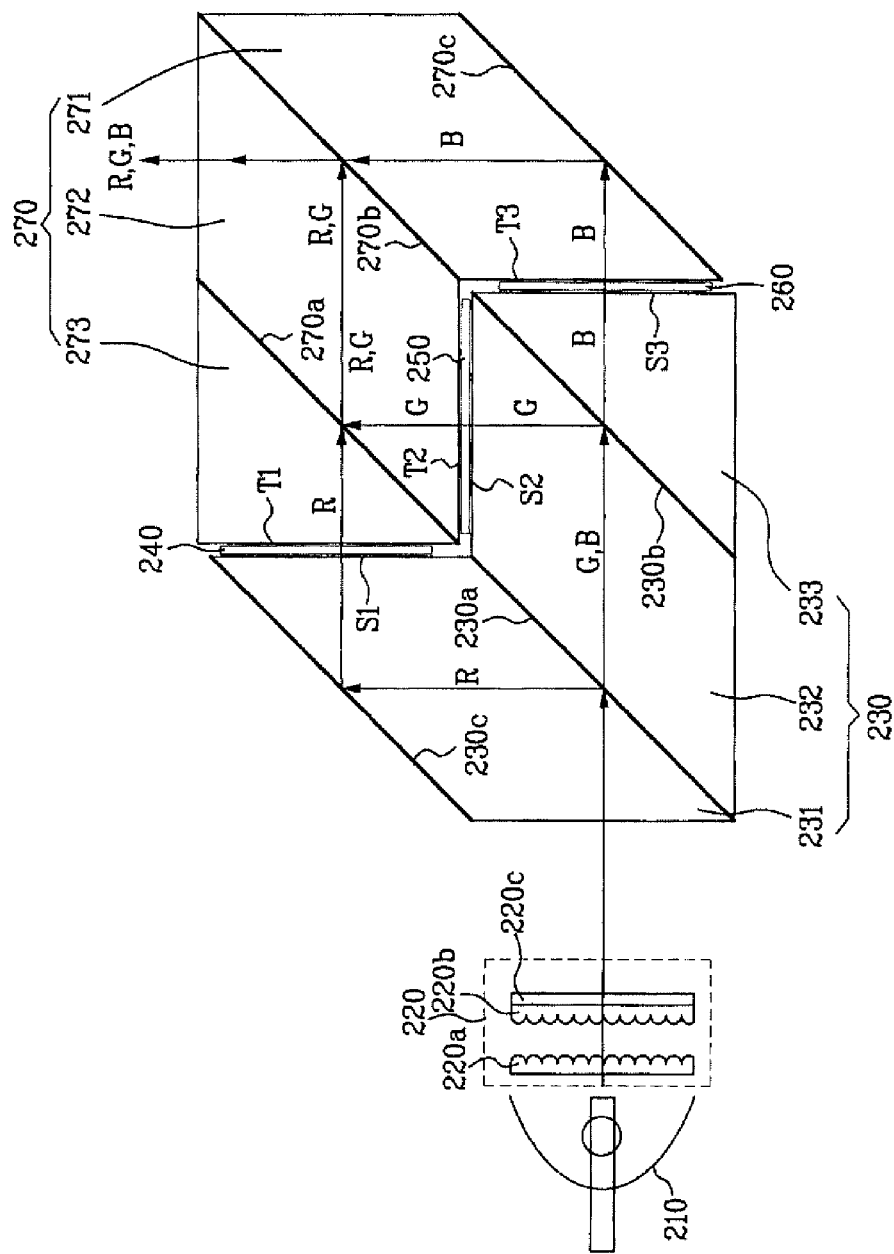
FIG. 6 illustrates a triple-panel lighting optical system according to a fifth embodiment of the present invention.

FIG. 6 illustrates a triple-panel lighting optical system according to a fifth embodiment of the present invention.

The constitution of the triple-panel lighting optical system according to the fifth embodiment of the present invention is basically similar to that of the first embodiment of the present invention, except for one difference in the following.

Instead of using two triangle-shaped color combining prisms 272a, 272b as illustrated in FIG. 2, in the fifth embodiment of the present invention a parallelogram-shaped color combining prism 272 (a second color combining prism) is employed. The third dichroic coating 270a is formed on one inclined surface of the second color combining prism 272, and the fourth dichroic coating 270b is formed on another inclined surface of the second color combining prism 272.

Since the rest of constitution and functions are identical with those of the first embodiment, they will not be discussed here.

Figure 7:
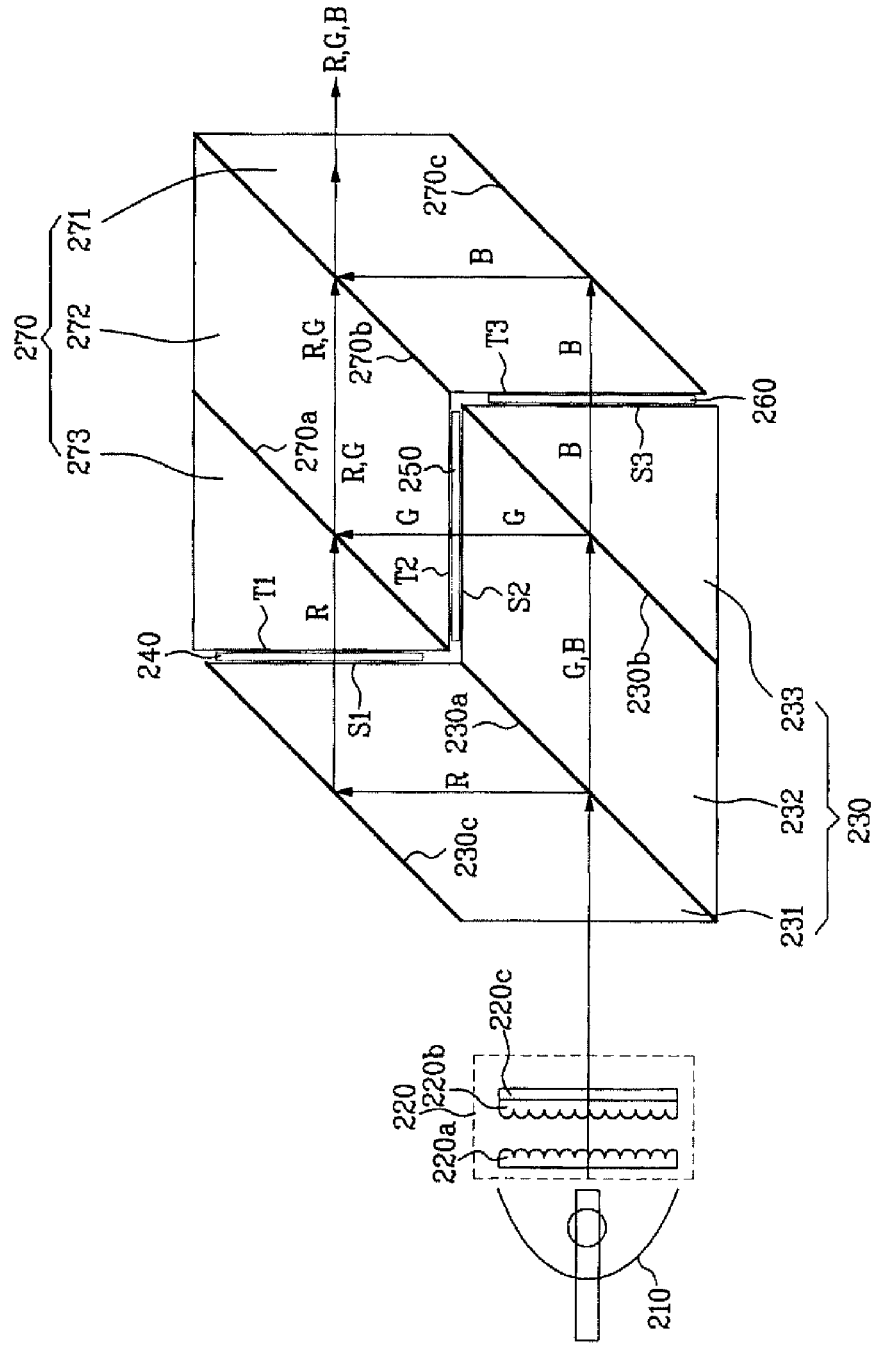
FIG. 7 illustrates a triple-panel lighting optical system according to a sixth embodiment of the present invention.

FIG. 7 illustrates a triple-panel lighting optical system according to a sixth embodiment of the present invention.

The constitution of the triple-panel lighting optical system according to the sixth embodiment of the present invention is basically similar to that of the second embodiment of the present invention shown in FIG. 3, except for one difference in the following.

Instead of using two triangle-shaped color combining prisms 272a, 272b as illustrated in FIG. 3, in the sixth embodiment of the present invention a parallelogram-shaped color combining prism 272 (a second color combining prism) is employed. The third dichroic coating 270a is formed on one inclined surface of the second color combining prism 272, and the fourth dichroic coating 270b is formed on one of inclined surfaces of the first color combining prism 271 in parallel with the total reflection coating 270c.

In other words, unlike in the fifth (second?) embodiment of the present invention, the fourth dichroic coating 270b transmits in the X-axis direction the yellow light from the third dichroic coating 270a, and also reflects in the X-axis direction the blue light from the total reflection coating 270c. As a result, a white light synthesized with the blue and yellow lights is outputted outside along the X-axis direction.

Since the rest of constitution and functions are identical with those of the first embodiment, they will not be discussed here.

FIG. 8 is a diagram to explain traveling distances of three color lights from a color separating prism to first, second and third LCDs, respectively, in a triple-panel lighting optical system according to the present invention.

Basically the color separating prism group 230 is designed in such a manner that RGB lights entering the first, second and third LCDs 240, 250, 260 through the color separating prism group 230 travel the same amount of distance from the lamp (the light source) 120.

In other words, the distances from the plane of incidence of the color separating prism group 230 to the first LCD 240 (A1+A2), the second LCD 250 (B1+B2) and the third LCD 260 (C1+C2) are all the same.

Since the traveling distances of the incident light from the lamp 210 to the first, second and third LCDs 240, 250, 260 via the color separating prism 230 are the same, a relay system is no longer needed.

Although not illustrated in the drawing, white light outputted from the color combining prism 270 is projected onto the screen through a projection lens and displaced as an image.

In conclusion, the lighting optical system of the present invention has the following advantages.

First, unlike in the related art, the traveling distance of each of the RGB lights from the LCDs to the projection lens are the same so the relay system is not required. This spontaneously fixes problems (such as an increase in the optical engine size, an increase in the optical elements, and a necessity for an optical axis array) that are often caused by installing the relay system in the optical system.

Second, the lighting optical system of the present invention has such a simple constitution that it includes prisms having dichroic coatings and/or total a reflection coating and LCDs only.

Third, instead of the X-prism as in the related art, the present invention utilizes dichroic coatings to synthesize light. This makes it possible to conform the states of polarization of incident lights and emitted lights according to color, and the contrast of the optical system can be corrected more easily.

Fourth, the lighting optical system of the present invention is smaller and cost-effective, and provides superior optical performance.

Fifth, the color separating prisms and the color combining prisms are tightly attached so that none of them is exposed to air, whereby any transformation of the light caused by air during the color separation/combination can be minimized.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A lighting optical system, comprising:
   a light separating means for separating incident light into three colored lights according to wavelength bands, and progressing the three separate colored lights for the same amount of distance from a light source of the incident light through different optical paths, and emitting the three separate colored lights;
   a first LCD, a second LCD and a third LCD for respectively receiving the three colored lights from the light separating means, forming images therefrom, and emitting the received three separate colored lights; and
   a light combining means for synthesizing the three separate colored lights emitted from the first LCD, the second LCD, and the third LCD, and outputting the synthesized light outside,
   wherein the light combining means comprises at least one triangle-shaped prism,
   wherein the light separating means includes light separation planes and emission planes and the light combining means includes incident planes,
   wherein at least two of the first LCD, the second LCD, or the third LCD, are located between the incident planes of the light combining means and the emission planes of the light separating means, wherein at least two of the first LCD, the second LCD, or the third LCD, are in contact with the incident planes and the emission planes,
and wherein the light separating means comprises:
- a first parallelogram-shaped prism comprising a first inclined surface including a first color separating plane and the first parallelogram-shaped prism further comprising a second inclined surface including a total reflection plane,
- a second parallelogram-shaped prism comprising an inclined surface including a second color separating plane, and
- a first triangle-shaped prism.

2. The system according to claim 1, wherein the first and second color separating planes on the first parallelogram-shaped prism and the second parallelogram-shaped prism are disposed, respectively, in parallel with a direction of the incident light, and the total reflection plane of the triangle-shaped prism is disposed in parallel with a direction perpendicular to the first color separating plane of the first parallelogram-shaped prism.

3. The system according to claim 1, wherein the light combining means comprises:
- a second triangle-shaped prism having the first color combining plane formed on one inclined surface;
- a third triangle-shaped prism having the second color combining plane formed on one inclined surface;
- a fourth triangle-shaped prism having the total reflection plane formed on one inclined surface;
- a fifth triangle-shaped prism having an inclined surface attached to the second color combining plane between the second triangle-shaped prism and the third triangle-shaped prism; and
- a sixth triangle-shaped prism having one inclined surface attached to the first color combining plane between the first triangle-shaped prism and the first LCD.

4. The system according to claim 1, wherein the light separating means is disposed such that the distances from the incidence planes of the light separating means to the first LCD, the second LCD, and the third LCD are substantially the same, respectively.

5. The system according to claim 1, wherein the light combining means is disposed such that the distances from the first LCD, the second LCD, and the third LCD to the outputting surface of the light combination means are substantially the same, respectively.

6. A lighting optical system, comprising:
a light separating means for separating incident light into three colored lights according to wavelength bands, and progressing the three separate colored lights for the same amount of distance from a light source of the incident light through different optical paths, and emitting the three separate colored lights;
a first LCD, a second LCD, and a third LCD for respectively receiving the three colored lights from the light separating means, forming images therefrom, and emitting the received three separate colored lights; and
a light combining means for synthesizing the three separate colored lights emitted from the first LCD, the second LCD, and the third LCD, and outputting the synthesized light outside,
wherein the light combining means comprises at least a triangle-shaped prism or a parallelogram-shaped prism,
wherein at least two of the first LCD, the second LCD, or the third LCD are located between the incident planes of the light combining means and the emission planes of the light separating means,
wherein the at least two of the first LCD, the second LCD, or the third LCD are in contact with the incident planes and the emission planes, and
wherein the light separating means comprises:
- a first parallelogram-shaped prism comprising a first inclined surface including a first color separating plane and the first parallelogram-shaped prism further comprising a second inclined surface including a total reflection plane,
- a second parallelogram-shaped prism comprising an inclined surface including a second color separating plane, and
- a triangle-shaped prism.

7. A lighting optical system, comprising:
a light separating means for separating incident light into three colored lights according to wavelength bands, and progressing the three separate colored lights for the same amount of distance from a light source of the incident light through different optical paths, and emitting the three separate colored lights;
a first LCD, a second LCD, and a third LCD for respectively receiving the three colored lights from the light separating means, forming images therefrom, and emitting the received three separate colored lights; and
a light combining means for synthesizing the three separate colored lights emitted from the first LCD, the second LCD, and the third LCD, and outputting the synthesized light outside,
wherein at least two of the first LCD, the second LCD, or the third LCD are located between incident planes of the light combining means and emission planes of the light separating means,
wherein the at least two of the first LCD, the second LCD, or the third LCD are in contact with the incident planes and the emission planes, and
wherein the light separating means comprises:
- a first parallelogram-shaped prism comprising a first inclined surface including a first color separating plane and the first parallelogram-shaped prism further comprising a second inclined surface including a total reflection plans,
- a second parallelogram-shaped prism comprising an inclined surface including a second color separating plane, and
- a triangle-shaped prism.

* * * * *